(12) United States Patent
Maharana et al.

(10) Patent No.: US 8,798,000 B2
(45) Date of Patent: Aug. 5, 2014

(54) MANAGING WIRELESS WIDE AREA NETWORK BANDWIDTH CONSTRAINTS IN A COMMUNICATION NETWORK

(75) Inventors: Tarun Maharana, Sunnyvale, CA (US); Puneet Batta, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 711 days.

(21) Appl. No.: 12/780,091

(22) Filed: May 14, 2010

(65) Prior Publication Data

US 2011/0280118 A1    Nov. 17, 2011

(51) Int. Cl.
*H04W 4/00*    (2009.01)

(52) U.S. Cl.
USPC .................. 370/331; 370/328; 370/230.1

(58) Field of Classification Search
USPC .......... 370/328, 331, 332, 333, 338, 400, 457
See application file for complete search history.

(56) References Cited

U.S. PATENT DOCUMENTS

| | | | | |
|---|---|---|---|---|
| 6,925,094 | B2 * | 8/2005 | Sharony et al. | 370/468 |
| 7,474,615 | B2 * | 1/2009 | Pirzada et al. | 370/230 |
| 7,551,641 | B2 * | 6/2009 | Pirzada et al. | 370/465 |
| 7,590,075 | B2 * | 9/2009 | Pirzada et al. | 370/254 |
| 7,675,890 | B2 * | 3/2010 | Wang | 370/338 |
| 7,720,464 | B2 * | 5/2010 | Batta | 455/411 |
| 7,826,428 | B2 * | 11/2010 | Malik et al. | 370/331 |
| 7,852,819 | B2 * | 12/2010 | Gil et al. | 370/338 |
| 7,907,561 | B2 * | 3/2011 | Mehta et al. | 370/328 |
| 7,961,673 | B2 * | 6/2011 | Jain | 370/328 |
| 8,009,560 | B2 * | 8/2011 | Khan et al. | 370/230 |
| 8,134,587 | B2 * | 3/2012 | Niu et al. | 348/14.12 |
| 8,638,752 | B2 * | 1/2014 | Gomez Velez et al. | 370/331 |
| 2005/0053046 | A1 | 3/2005 | Wang | |
| 2007/0008978 | A1 | 1/2007 | Pirzada et al. | |
| 2007/0230411 | A1 * | 10/2007 | Batta | 370/338 |
| 2009/0147697 | A1 * | 6/2009 | Malik et al. | 370/254 |
| 2010/0165840 | A1 * | 7/2010 | Khan et al. | 370/232 |
| 2010/0296499 | A1 * | 11/2010 | Karaoguz et al. | 370/338 |

FOREIGN PATENT DOCUMENTS

EP    1562390 A1    8/2005

OTHER PUBLICATIONS

Ahuja Cisco Systems T et al.: "Benchmarking Methodology for Wireless LAN Switching Systems ; draft-alexander-bmwg-wlan-switch-meth-01.txt," IETF Standard-Working-Draft, Internet Engineering Task Force, IETF, CH, No. 1, Jan. 2, 2008, p. 9.
International Search Report & Written Opinion mailed on Apr. 18, 2011 for International Application No. PCT/US2010/062140.

* cited by examiner

*Primary Examiner* — Brian O'Connor
(74) *Attorney, Agent, or Firm* — Brian M. Mancini

(57) ABSTRACT

A technique to manage wireless wide area network bandwidth constraints in a communication network includes; prioritizing client activities in a serving access point; detecting that wired domain access is inactive while wireless wide area domain access is active; and utilizing an available bandwidth of the wireless aide area domain access for the highest priority client activities. The lower priority client activities can be address in various different ways including transferring to other available wired access.

12 Claims, 4 Drawing Sheets

MANAGING WIRELESS WIDE AREA NETWORK BANDWIDTH CONSTRAINTS IN A COMMUNICATION NETWORK

FIELD OF THE DISCLOSURE

The present invention relates generally to wireless communication networks and more particularly to managing wireless wide area network bandwidth constraints in a communication network.

BACKGROUND

Wireless wide-area networks (WWAN) and comparable IEEE 802.11 wireless communication networks are able to provide communications for their users utilizing either wired or wireless access support, which transfers communication traffic between a user terminal and the wired/wireless domain. Typical wired support can be a digital subscriber line (DSL) or other cable access. Typical wireless support can be third generating (3G) wireless cellular access, for example. In particular, an Access Point (AP) and a switch of the WWAN takes communications with the user terminal and from there the communications are routed to the wired/wireless domain.

At present, 3G bandwidth is highly variable, which can cause problems with handling communication traffic in particular situations. Typical 3G bandwidths presently hover around 1 Mbps, whereas an access point (e.g. IEEE 802.11n radio) can allow up to 300 Mbps per user terminal. Clearly there is mismatch between the wireless access side and the WWAN. Accordingly, the WWAN relies heavily on wired access (e.g. DSL). However, a failure of wired access, such as DSL failure, will leave the AP with limited wireless bandwidth for the user terminals it is serving. In addition, a recovery back to DSL could take between few hours to a day or more. As a result, during the time WWAN is in operation, the AP or wireless switch would not be able to pass all its traffic outside of the WWAN via 3G. At a certain point, the AP or switch queues shall saturate and drop packets since the 3G interface is bottleneck. As of today no mechanism is available to handle this situation Some solutions would be through traffic shaping, rate limiting, or using Differentiated Services Code Point-based dropping of packets in the case of using WWAN, wherein traffic gets priority in order of voice, video, data, text, etc. However, there may be situations, such as in a store, where the proprietor desires that his cash register that is sending data traffic should have a higher priority than a customer phone call. Prioritized dropping of packets would be undesirable in such a situation, since that would result in a customer uncontrollably retaining a higher priority that a critical data application, and would lead to dropping of traffic of the utmost priority to the store, as the customers could dominate all available bandwidth, bringing the network to a crawl.

Accordingly, there is a need for new techniques to manage wireless wide area network bandwidth constraints in a communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
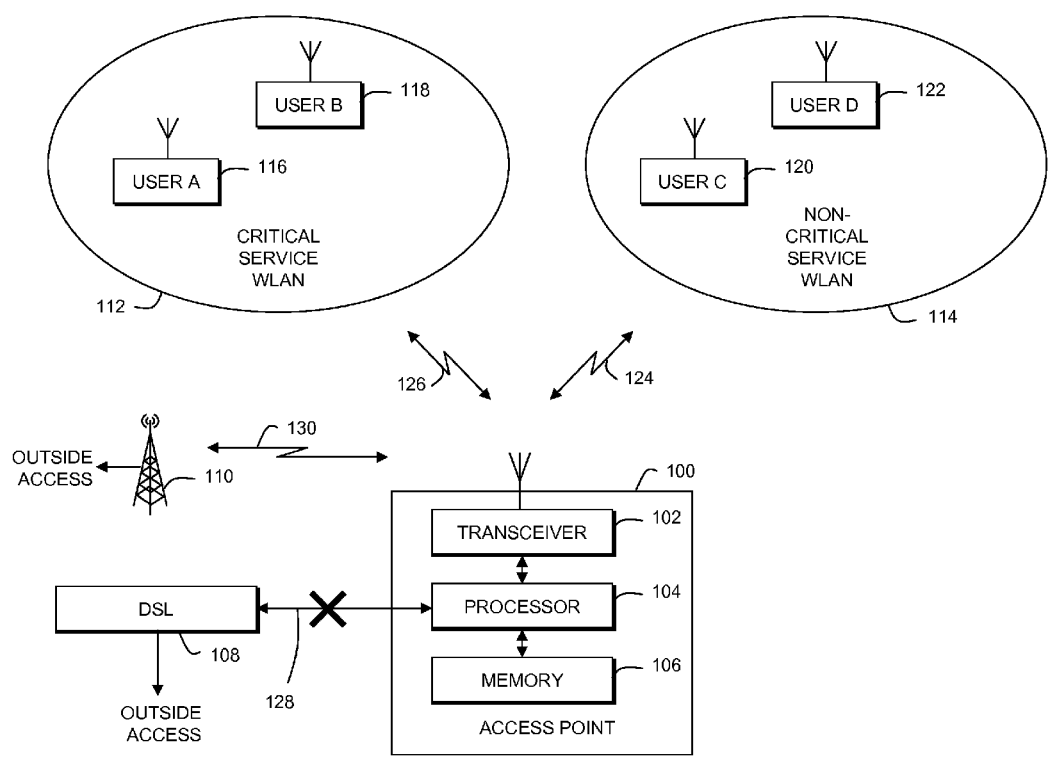
FIG. 1 is a simplified block diagram of a communication network, in accordance with one embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides novel techniques to manage wireless wide area network bandwidth constraints in a communication network. In particular, preferential treatment is given to user activities so that the mission-critical users always remain connected and obtain access to the outside world via 3G.

FIG. 1 is a block diagram depiction of a wireless communication network, including a wireless wide-area network (WWAN) or other IEEE 802.11 wireless communication system. However, it should be recognized that the present invention is also applicable to other wireless communication systems. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems. The communication system represents a system operable in a network that may be based on different wireless technologies. For example, the description that follows can apply to an access network that is IEEE 802.xx-based, employing wireless technologies such as IEEE's 802.11, 802.16, or 802.20, modified to implement embodiments of the present invention.

Referring to FIG. 1, there is shown a block diagram of an access point (AP) 100 adapted to support the inventive concepts of the preferred embodiments of the present invention. Those skilled in the art will recognize that FIG. 1 does not depict all of the network equipment necessary for system to operate but only those system components and logical entities particularly relevant to the description of embodiments herein. For example, an access point, eNodeB, or base station can be connected with or comprise one or more devices such as wireless area network stations (which include access nodes (ANs), Media Access Controllers (MAC), AP controllers, and/or switches), base transceiver stations (BTSs), base site controllers (BSCs), packet control functions (PCFs), packet control units (PCUs), and/or radio network controllers (RNCs). However, none of these other devices are specifically shown in FIG. 1.

AP 100 is depicted in FIG. 1 as comprising a processor 104 coupled to a transceiver 102 and memory 106. In general, components such as processors, memories, and transceivers are well-known. For example, the transceiver 102 is operable to communicate with user devices over an IEEE 802.11 interface. In addition, AP processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement an AP processor that performs the given logic. Therefore, AP 100 represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the AP aspect of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely a preferred option.

The AP 100 uses a local area wireless interface for communication with multiple user equipment or user stations (User A ... User D) 116-122. The local area wireless interface correspond to a forward link and a reverse link used in communications between the Users and the AP. User stations or remote unit platforms are known to refer to a wide variety of consumer electronic platforms such as mobile stations, mobile units, mobile nodes, user equipment, subscriber equipment, subscriber stations, access terminals, remote terminals, terminal equipment, gaming devices, personal computers, and personal digital assistants, and the like, all referred to herein as client devices. In particular, each client device comprises a processor that can be coupled to a transceiver, antenna, a keypad, a speaker, a microphone, and a display, as are known in the art and therefore not shown.

Client devices are known to comprise basic components such as, but not limited to, microprocessors, digital signal processors (DSPs), microcontrollers, memory devices, application-specific integrated circuits, and/or logic circuitry. Such devices are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic.

The present invention provides various techniques to assign the limited bandwidth of available wide area access to the highest priority client activities when wired access is dropped. As use herein "client activities" can include client devices or applications running on a client device. In operation, the present invention maintains the highest priority or critical client activities and either transfers or shuts down lower priority or non-critical client activities.

Referring back to FIG. 1, a first embodiment of the present invention is shown which introduces the concept of a flexible beacon for a wireless local area network. In particular, a serving AP 100 can prioritize the client activities or devices into highest priority (critical) activities and lower priority (non-critical) activities, which can be stored in memory 106. For example, using the store example above, where a store owner provides and controls a serving access point, the store owner could give his cash register data transfer the highest priority, over that of any customer's voice call. Priority could be assigned to devices themselves or to specific activities on devices, e.g. a device could a high priority for an E911 call, but a low priority for a normal voice call. Once the activities and/or devices are prioritized, the store owner can provide two or more wireless local area networks (WLAN) for those high priority (critical) client activities and those lower priority (non-critical) client activities.

As shown, the AP 100 now supports a critical service WLAN 112 and one or more non-critical service WLAN 114. The highest priority client activities (User A 116, User B 118) such as the store owner's cash register or printer activities are assigned to the critical WLAN 112. The lower priority client activities (User C 120, User D 122) such as visiting customers' cell phones or laptops are assigned to the non-critical WLAN 114. The non-critical WLAN is enabled to operate under a flexible beacon of the AP 100, in accordance with the present invention. Specifically, when the processor 104 of the AP 100 detects that its connection 128 to its wired (e.g. DSL 108) access has failed, but that it does have an available connection 130 to a wireless wide area access (WWAN) 110, then the AP 100 will transfer communications 126 of client activities in its critical WLAN 112 to the 3G connection 130 to the WWAN 110, while at the same time the AP 100 will stop beaconing to at least one of the non-critical, flexible beacon-enabled WLANs 114, thereby shutting down communications 124 with non-critical activities (User C 120, User D 122). Preferably, devices running those non-critical client activities to be shut down, can first be de-authenticated by the AP 100.

More preferably, if the 3G connection 130 to the WWAN 110 has the bandwidth to handle more activities than are being used by the critical WLAN 112, then it may not be necessary to shut down all the non-critical WLANs 114 or activities. In particular, upon a DSL failure all of the AP-served activities could be transferred to the 3G connection, but then if the number of packets dropped from a queue tied to the 3G interface 130 exceeds a predefined threshold, this would trigger the shutdown of one or more non-critical WLAN 114, as described above, in order to dynamically maximize WWAN bandwidth without overburdening it and dropping critical traffic.

At this time, APs have capability to monitor the wired port (i.e. critical resource monitoring) and upon the resumption of DSL service the AP default gateway recovers to wired access, and the flexible beacons shall again start beaconing in order to dynamically enable the non-critical WLANS 114.

Figure 2:
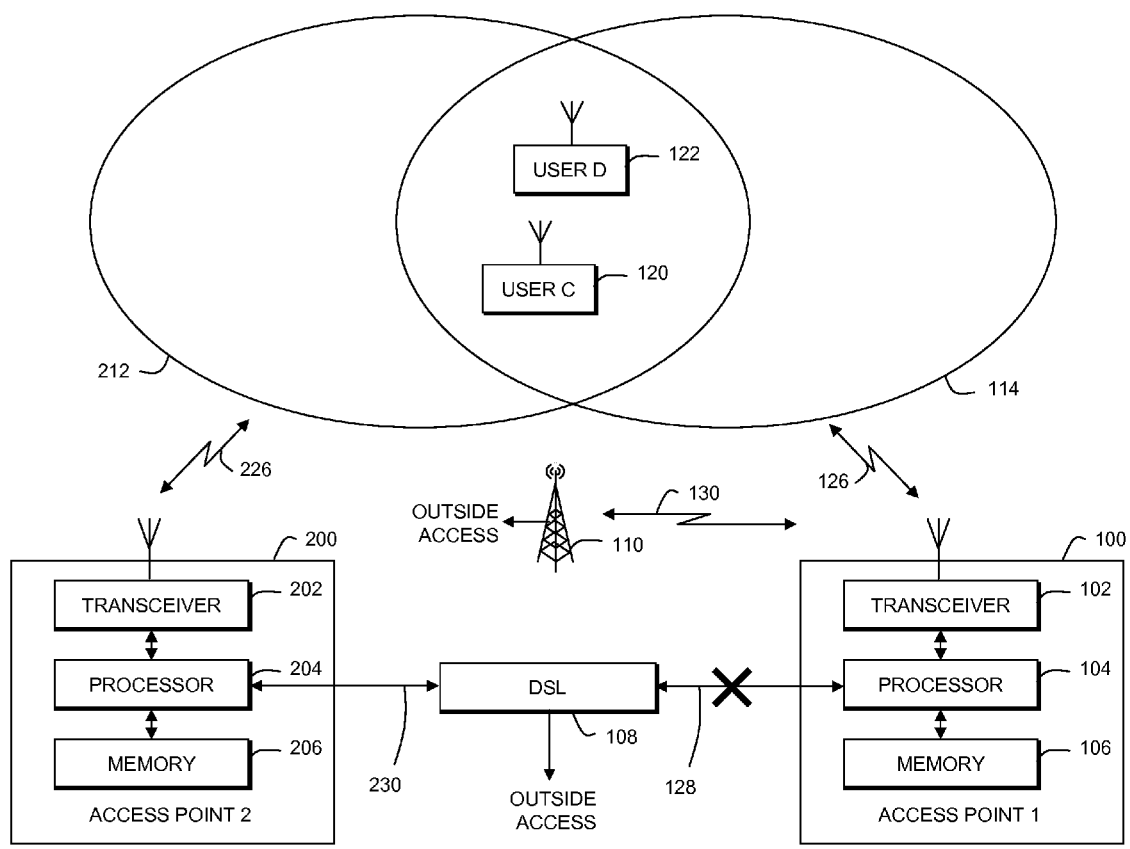
FIG. 2 is a simplified block diagram of a communication network, in accordance with another embodiment of the present invention.

FIG. 2 illustrates another embodiment of the present invention. In this scenario, there is an available second AP 200 that has a similar configuration as the first AP 100, and which has wired access 230 and possible WWAN access 110. Preferably, the first AP 100 and the second AP 200 are maintained in pairs and can be identical, although these are not requirements. Again AP 100 can have at least one flexible beacon-enabled, non-critical WLAN 114 (critical WLANs are not shown). On the instance of the same scenario of an outage of the DSL connection 128 for the first AP 100 as described above, the non-critical, lowest priority client devices of the at least one WLAN 114 can get de-authentication packets from the first AP 100, which will then stop beaconing for that WLAN 114. The non-critical, lowest priority client activities (User C 120 and User D 122) are then forced to roam to a WLAN 212 of the second AP 200, which still has a DSL connection 230. In this way, communications 226 from the client activities (User C 120 and User D 122) can proceed through the DSL connection 230, 108 of the second AP 200. Critical client activities (not shown) can still communicate 126, 130 with the WWAN 110 via the first AP 100 as previously described for FIG. 1.

Figure 3:
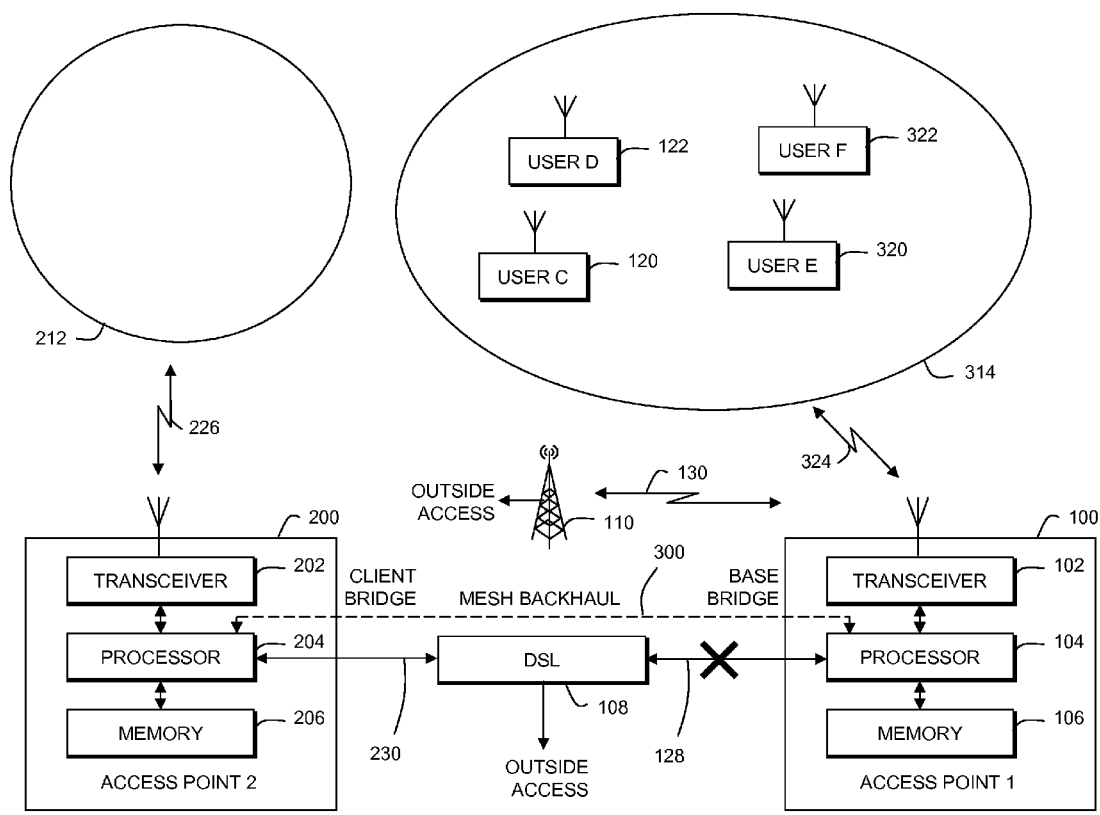
FIG. 3 is a simplified block diagram of a communication network, in accordance with yet another embodiment of the present invention.

FIG. 3 illustrates yet another embodiment of the present invention. In this scenario, there is an available second AP 200 that has a backhaul connection to the first AP 100, such as in a mesh network, and which has wired access 230 and possible WWAN access 110. Again AP 100 can have at least one flexible beacon-enabled, non-critical WLAN 114 (critical WLANs are not shown). On the instance of the same scenario of an outage of the DSL connection 128 for the first AP 100 as described above, the non-critical, lowest priority client devices of the at least one WLAN 114 can get de-authentication packets from the first AP 100, which will then stop beaconing for that WLAN 114. The non-critical, lowest priority client activities (User C, D, E, F 120, 122, 320, 322) are then forced to roam to wired access 230 in the second AP 200 via a backhaul bridge 300 between the serving AP 100 and the second AP 200, i.e. non-critical client activities are reassociated to the client bridge. In this way, communications 324 from the client activities can proceed through the DSL connection 230, 108 of the second AP 200 via the bridge 300. Critical client activities (not shown) can still communicate 130 with the WWAN 110 via the first AP 100 as previously described for FIG. 1.

Optionally, the configuration of FIG. 3 can be used for dynamic load balancing by which the access points in mesh mode can load balance their non-critical client activities between a base bridge and a client bridge. In particular, when the DSL connection goes down on base bridge, the AP 100 can de-authenticate half of the clients activities (User C 120 and User D 122) on a non-critical WLAN 314 and force these client activities to roam to the client bridge, while the other half of the non-critical (and/or critical) client activities (User E 320 and User F 322) can use the 3G interface 130, 110, thus achieving lesser traffic on the 3G interface and load balance since the second AP 200 has less traffic than the serving AP 100.

Figure 4:
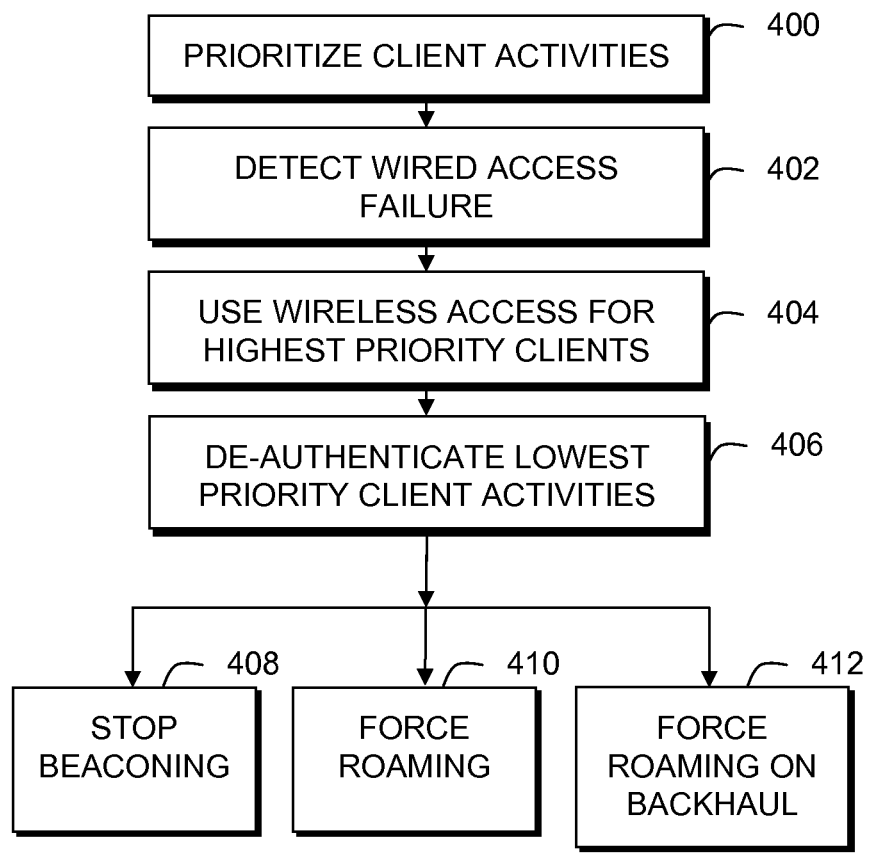
FIG. 4 is a flowchart of a method, in accordance with the present invention.

FIG. 4 illustrates a flowchart of a method to manage wireless wide area network bandwidth constraints in a communication network, in accordance with the present invention.

The method starts by a serving access point prioritizing client activities and/or devices. It is envisioned that the owner of the access point (AP) will control this prioritization. Although it is easiest to prioritize client devices, since client activities can be linked to specific devices, it should be recognized that client devices may perform different activities, and that it could be beneficial to prioritize activities over just devices. Preferably, client devices can be separated into different wireless local area networks (WLANs) based on priority, such as grouping critical activities into one WLAN and non-critical activities into one or more other WLANs. In this way, a priority can be assigned to a WLAN, and all activities therein. Optionally, prioritizing client activities can dynamically change depending on a time of day. For example, from 9:00 am to 5:00 pm cash registers will have a high priority, but from 5:00 pm to 10:00 pm the backup systems will have a higher priority. In accordance with the present invention, the non-critical WLANs are enabled to have their beacons stopped (i.e. flexible beacon), as will be detailed below.

The AP proceeds by detecting 402 an outage in wired domain access while wireless wide area domain access is active. In other words, a failure in a DSL connection, for example, will allow a failover to an active WWAN domain. Such failure can also result in the stopping of a beacon to a non-critical WLAN if necessary.

If the AP detects a wired domain access failure, the AP will utilize 404 an available bandwidth of the WWAN domain access for the highest priority client activities. Preferably, the highest priority activities are grouped together in devices operating on a critical WLAN. The lowest priority activities can be shut down or transferred. More preferably, if the WWAN connection has the bandwidth to handle more activities than are being used by the critical WLAN, then it may not be necessary to shut down all non-critical activities. In particular, upon a DSL failure all of the activities could be transferred to the WWAN connection, but then if the number of packets dropped from a queue tied to the WWAN interface exceeds a predefined threshold, this would trigger the shutdown of WLAN(s).

One technique to shut down client activities is to de-authenticate 406 a client device/activity on a non-critical WLAN. This can be done for individual client devices or for all devices on a particular non-critical WLAN. The particular WLAN can then be shut down by stopping beaconing 408 for that WLAN, inasmuch as that WLAN is enabled to respond to a flexible beacon. Critical activities can continue to communicate on the WWAN.

Another technique to shut down client activities also can de-authenticate 406 a client device/activity on a non-critical WLAN. This can be done for individual client devices or for all devices on a particular non-critical WLAN. The particular WLAN can then be shut down by stopping beaconing 408 for that WLAN forcing 410 the lowest priority client activities to roam to other available wired access via a WLAN in a second wireless network. Critical activities can continue to communicate on the WWAN.

Yet another technique to shut down client activities also can de-authenticate 406 a client device/activity on a non-critical WLAN. This can be done for individual client devices or for all devices on a particular non-critical WLAN. The particular WLAN can then be shut down by stopping beaconing 408 for that WLAN forcing 412 the lowest priority client activities to roam to other available wired access via a backhaul bridge between the serving access point and the second access point. Critical activities can continue to communicate on the WWAN.

Optionally, forcing 412 via the backhaul bridge can be used for dynamic load balancing by which the access points in a mesh mode can load balance their non-critical client activities between a base bridge and a client bridge. In particular, when the DSL connection goes down on a base bridge, the AP can de-authenticate 406 a portion (e.g. half) of the clients activities on a non-critical WLAN and force these client activities to roam to the client bridge, while the other portion (e.g. half) of the non-critical client activities can use the WWAN connection.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method to manage wireless wide area network bandwidth constraints in a communication network having wired domain access, wireless local area domain access, and wireless wide area domain access, the method comprising:

prioritizing client activities of client devices by a serving access point of the client devices, wherein prioritizing includes assigning different prioritized client activities to either a critical-priority wireless local area network or at least one non-critical-priority wireless local area network;

detecting that wired domain access is inactive to the serving access point while wireless wide area domain access is active for the serving access point;

in response to detecting that the wired domain access is inactive while the wireless wide area domain access is active, the serving access point utilizing an available bandwidth of the wireless wide area domain access to transfer critical-priority client activities in the critical-priority wireless local area network assigned to the wireless wide area domain access; and de-authenticating at least one client device running non-critical-priority client activities on at least one of the non-critical-priority wireless local area networks.

2. The method of claim 1, wherein the non-critical wireless local area networks operate under a flexible beacon of the serving access point, and wherein the de-authenticating step includes shutting down communication with, and stopping the flexible beacon to, non-critical-priority clients in at least one non-critical-priority wireless local area network.

3. The method of claim 2, wherein beacon stopping for a wireless local area network is triggered upon a numbers of packets dropped from a queue to the wireless wide area domain access from that wireless local area network exceeding a threshold.

4. The method of claim 2, wherein beacon stopping for a wireless local area network is triggered upon detecting a failure in wired domain access.

5. The method of claim 2, wherein the non-priority wireless local area networks are configured to respond to beacon stopping, and further comprising forcing the non-priority client activities to roam to other available wired access in a second wireless local area network.

6. The method of claim 1, wherein the non-critical wireless local area networks operate under a flexible beacon of the serving access point, and wherein the remaining non-criticalpriority wireless local area networks are enabled to respond to de-authenticating by accepting de-authenticated packets from the de-authenticated at least one client device that is forced to roam to a remaining non-critical-priority wireless local area network having a connection to the wired domain access such that the at least one client device can communicate over the wired domain access.

7. The method of claim 1, further comprising de-authenticating the non-priority client activities.

8. The method of claim 1, further comprising forcing the non-priority client activities to roam to wired access in a second access point via a backhaul bridge between the serving access point and the second access point.

9. The method of claim 1, wherein prioritizing client activities can dynamically change depending on a time of day.

10. An access point configured to manage wireless wide area network bandwidth constraints in a communication network having wired domain access, wireless local area domain access, and wireless wide area domain access, the access point comprising:
- a transceiver configured to communicate with client devices serviced by the access point; and
- a processor coupled to the transceiver, the processor configured to prioritize client activities of client devices serviced by the access point, wherein prioritizing includes assigning different prioritized client activities to either a critical-priority wireless local area network or at least one non-critical-priority wireless local area network, detect that wired domain access is inactive to the serving access point while wireless wide area domain access is active for the serving access point, in response to detecting that the wired domain access is inactive while the wireless wide area domain access is active, the serving access point utilizing an available bandwidth of the wireless wide area domain access to transfer critical-priority client activities in the critical-priority wireless local area network assigned to the wireless wide area domain access, and de-authenticate at least one client device running non-critical-priority client activities on at least one of the non-critical-priority wireless local area networks.

11. The access point of claim 10, further comprising a memory coupled to the processor, wherein the memory stores associations between priorities, client devices, client activities, and wireless local area networks.

12. A system configured to manage wireless wide area network bandwidth constraints in a communication network having wired domain access, wireless local area domain access, and wireless wide area domain access, the system comprising:
- wired domain access;
- wireless wide area domain access;
- wireless local area domain access including at least two wireless local area network; and
- an access point configured to prioritize client activities of client devices serviced by the access point, wherein prioritizing includes assigning different prioritized client activities to either a critical-priority wireless local area network or at least one non-critical-priority wireless local area network, detect that the wired domain access to the serving access point is inactive while the wireless wide area domain access is active for the serving access point, in response to detecting that the wired domain access is inactive while the wireless wide area domain access is active, the serving access point utilizing an available bandwidth of the wireless wide area domain access to transfer critical-priority client activities in the critical-priority wireless local area network assigned to the wireless wide area domain access, and de-authenticate at least one client device running non-critical-priority client activities on at least one of the non-critical-priority wireless local area networks.

* * * * *